United States Patent [19]

Ludwig

[11] Patent Number: 4,949,991
[45] Date of Patent: Aug. 21, 1990

[54] ROLLOVER PROTECTION SYSTEM FOR VEHICLES

[75] Inventor: Dieter Ludwig, Weinheim, Fed. Rep. of Germany

[73] Assignee: Deere & Company, Moline, Ill.

[21] Appl. No.: 385,757

[22] Filed: Jul. 26, 1989

[30] Foreign Application Priority Data

Aug. 3, 1988 [DE] Fed. Rep. of Germany ....... 3826392

[51] Int. Cl.⁵ .............................................. B60R 21/13
[52] U.S. Cl. .................................... 280/756; 296/188
[58] Field of Search .......................... 280/756; 296/188

[56] References Cited

U.S. PATENT DOCUMENTS

| | | | |
|---|---|---|---|
| 3,188,111 | 8/1965 | Ells et al. | 280/756 |
| 3,584,897 | 6/1971 | Frantz | 280/756 |
| 3,917,310 | 4/1975 | Mitsuishi | 280/756 |
| 4,158,460 | 6/1979 | White. | |
| 4,666,183 | 5/1987 | Azzarello. | |

FOREIGN PATENT DOCUMENTS

| | | | |
|---|---|---|---|
| 1919360 | 8/1970 | Fed. Rep. of Germany | 280/756 |
| 2543077 | 3/1977 | Fed. Rep. of Germany. | |
| 8803908 | 5/1988 | Fed. Rep. of Germany. | |
| 515 | 1/1978 | Japan | 280/756 |
| 1522906 | 8/1978 | United Kingdom | 280/756 |
| 2175259 | 11/1986 | United Kingdom. | |

OTHER PUBLICATIONS

Photographs of Massey-Ferguson 360 Tractor.

*Primary Examiner*—Kenneth R. Rice

[57] ABSTRACT

A foldable rollover protection system, or ROPS, is equipped with a lever to assist in raising and lowering the ROPS, without the necessity of the operator leaving the vehicle seat. The lever is slidably mounted in a guide on the upper, folding, part of the ROPS to allow it to slide out of the way when not in use. Appropriate holes are provided in the pivot bracket into which a pin can be inserted to lock the ROPS in its raised or lowered positions. A spring clip is provided which can hold the pin in place in either set of holes.

11 Claims, 4 Drawing Sheets

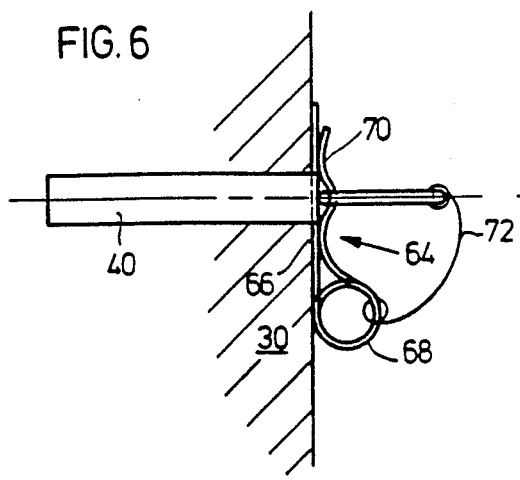
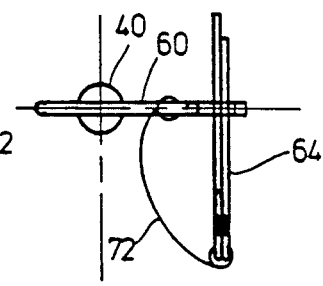
FIG. 6
FIG. 7
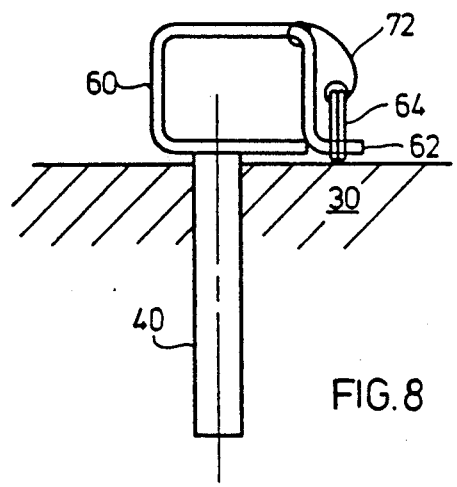
FIG. 8

4,949,991

ROLLOVER PROTECTION SYSTEM FOR VEHICLES

Background of the Invention

1. Field of the Invention

The present invention concerns a rollover protection system for a vehicle, in particular an adjustable rollover protection system for an agricultural tractor.

2. Description of the Related Art

For safety reasons, most vehicles are provided with some form of rollover protection system (or ROPS) which is capable of supporting the forces generated by the weight of the vehicle in the event of a rollover, maintaining a free space for the operator to reduce the danger of injury. When a cab is provided, the ROPS is built into the cab. When a cab is not provided, the rollover protection system frequently consists of a generally U-shaped bar whose free legs are connected to the vehicle chassis and whose cross bar is located above the head of the operator. In this situation, the ROPS is frequently the part of the vehicle extending upward to the greatest degree.

Such a vertically ROPS projecting may be detrimental in certain situations, for example, if the vehicle is to be used in an orchard or needs to negotiate a gateway with low overhead clearance. Therefore rollover frames have been proposed that are adjustable in height. For example, rollover arrangements for tractors are known that are configured as a two-part arrangement, where the upper part is pivotally connected to the lower and can be rotated downward after releasing an arresting device. With these systems, it is necessary for the operator to leave the vehicle seat to rotate the upper part back up, which is rather inconvenient.

Summary of the Invention

The object of the present invention therefore is to provide an adjustable ROPS which can easily be returned to its full, upright position from the operator's seat, without requiring the operator to leave the seat.

This object is achieved according to the present invention by providing a lever on the upper part of the ROPS to allow pivoting of the upper part between its raised or lowered position, with a handgrip at the free end of the lever. The lever may be a round or profiled rod or pipe, or any other convenient form. The lever arm is long enough that the forces required to tilt the upper frame are so low that it can be operated by even relatively weak people without too much difficulty. The position of the handgrip of the lever is arranged so that it can be reached easily from the operator's seat.

The invention is particularly advantageous for those rollover arrangements in which the posts are attached to the rear part of the vehicle, for example to the axle housing for the rear wheels, since this normally is within easy reach of the operator's seat.

A preferred embodiment of the invention provides that the lever engages the upper frame in the vicinity of the rotational axis. Almost the entire length of the lever then is utilized as a lever arm, which means that the handgrip is located far from the center of rotation and permits rotation with relatively small force in order to tilt the upper frame. Preferably, the lever is directed approximately parallel to a post when the upper frame is in its raised position and extends generally downward from the rotational axis. By this means the handgrip is located below the center of rotation, where the seated operator can easily grasp it and move it upward in order to tilt the upper frame.

It is particularly advantageous that a guide be attached to the upper frame in which the lever can move axially. When the upper frame is in its raised position, the lever slides downward in the guide so that the operator can easily grasp the handgrip. When the upper frame is tilted downward, the lever initially extends upward, but under the force of gravity it slides downward through the guide so that the end opposite the handgrip projects downward. The guide accommodates the cross-sectional shape of the lever and may be conveniently formed of round or square tubing.

It is appropriate that the lever contain a protective device to protect the hand of the operator from injury, in particular from crushing. Such protection can be realized by providing a disk-shaped shield, which is attached to the lever in the vicinity of the handgrip. Such a shield has the added advantage that it serves as a stop for the lever when sliding in its guide.

An additional stop is preferably located at the opposite end of the lever. This stop may be configured as a disk or a cross pin.

To secure the upper frame in its raised position, a further embodiment of the invention provides that at least one post carries a bracket projecting upward to engage a recess in the raised upper frame, and that the bracket and the upper frame are provided with corresponding cross holes through which a retaining pin can be inserted. The configuration of bracket and recess assures proper positioning and reinforcement of the upper frame.

In order to fix the position of the upper frame in its tilted lower position, a further embodiment of the invention provides that the posts and the upper frame carry brackets extending sideward near the axis of rotation. The brackets of at least one post and the upper frame are equipped with holes oriented parallel to the axis of rotation which are aligned when the upper frame is tilted downward so that a retaining pin can be inserted. Both the cross holes that act to secure the upper frame in its raised position and the holes that secure the upper frame in the tilted position should be arranged in such a location that the insertion of the retaining pin in either can be accomplished from the operator's seat during the tilting of the upper frame. This insures easy handling for the operator.

For ease of operation the preferred configuration of the retaining pin includes a loop-shaped handgrip.

To secure the retaining pin against axial movement or disengagement due to shock or vibration, a preferred embodiment provides the retaining pin with a cross bar in the area protruding from the hole, in which the handgrip is located. In addition, a retaining spring is attached to the upper frame in the vicinity of the cross hole and/or the hole. The location of the retaining spring is selected in such a way that upon rotation of the retaining pin in the hole the cross bar is engaged by the retaining spring in order to prevent axial motion of the retaining pin. The retaining spring may, for example, be welded to the upper frame.

The handgrip and cross bar are appropriately made in one piece from round bar.

In order to cover the two differing positions of the upper frame, without requiring a retaining spring for each position, it is advantageous to arrange the retaining spring in such a way that it can engage the cross bar of the retaining pin regardless of whether it is inserted in the cross hole or the hole.

In the preferred embodiment, the retaining pin and the retaining spring are connected to each other so they cannot be lost. This property can be provided by a wire (e.g., steel wire), a chain, a plastic band, or with a plastic filament. By this means the pin cannot be lost.

Brief Description of the Drawings

The present invention will be described in greater detail with reference to the following drawings:

FIGS. 6, 7 and 8 show a side view, a plan view and an additional side view, respectively, of a retaining pin with retaining spring according to the present invention.

Detailed Description of the Preferred Embodiment

Figure 1:
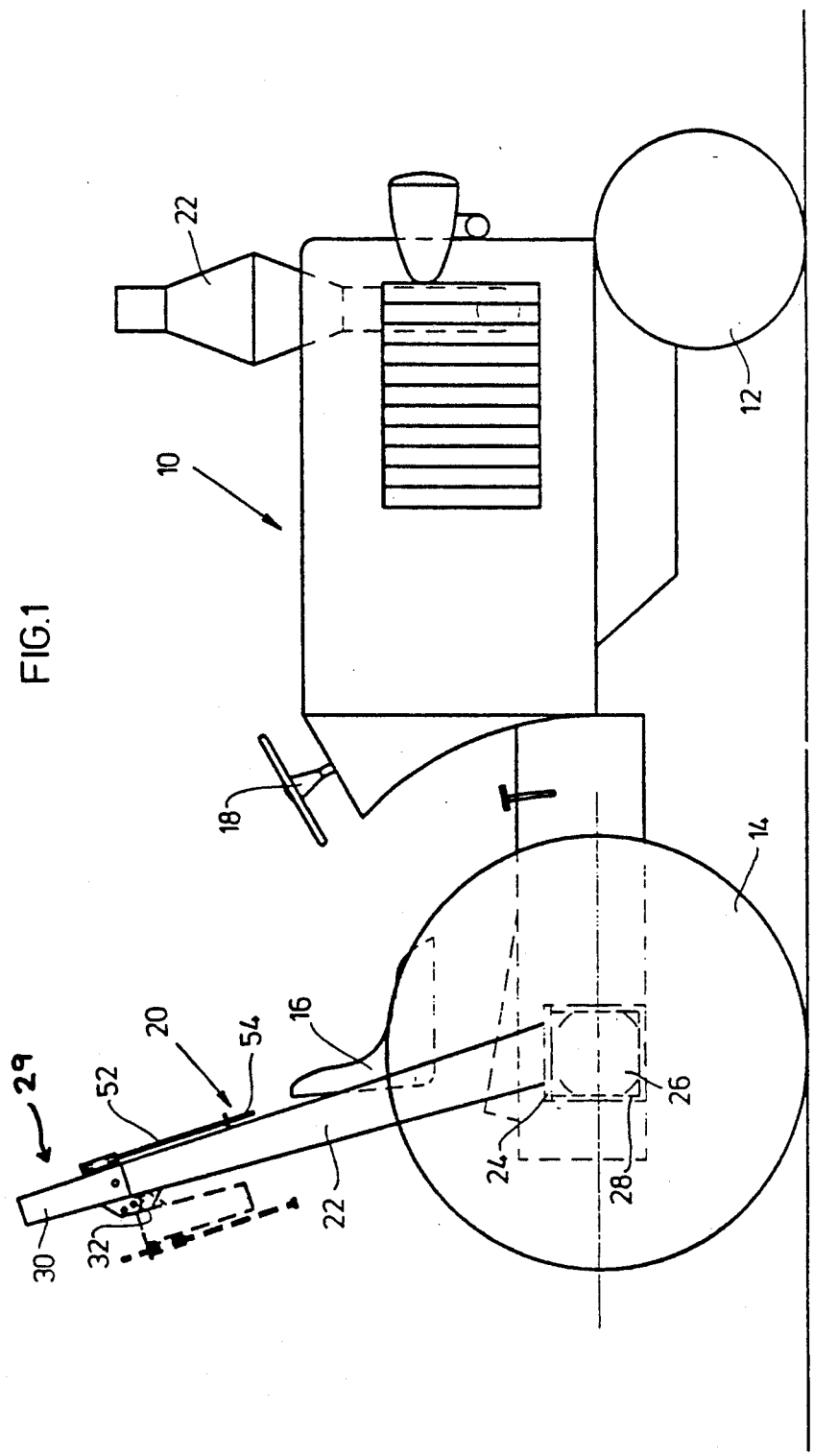
FIG. 1 shows a schematic side view of a tractor with a rollover arrangement according to the present invention.

FIG. 1 depicts a tractor 10 equipped with the rollover protection system according to the present invention. The tractor 10 contains, in particular, front wheels 12, rear wheels 14, an operator's seat 16 and a steering wheel 18. The ROPS is located in the rear region of the tractor 10, in the vicinity of the operator's seat 16. In the raised position shown, the rollover bar 20 extends upwards beyond the other components of the tractor, in particular the exhaust pipe 22.

The rollover bar 20 has two side posts 22 which are attached to base plates 24, which in turn are mounted on the axle housings 26 by means of U-bolts 28. The upper frame 29 is pivotally mounted at the upper end of the posts 22 by means of the pivot pin 32 and is free to rotate. In FIG. 1, the upper frame 29 is shown in solid lines in its raised position, and in dotted lines in its tilted position.

Figure 3:
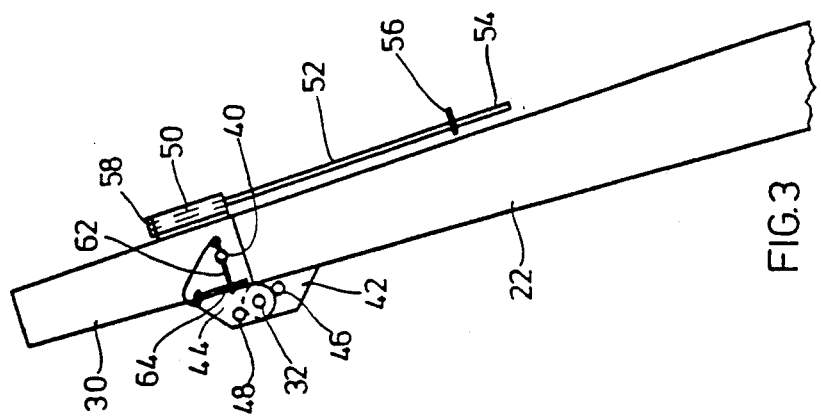
FIGS. 2 and 3 show views from the rear and from the right side, respectively, of the rollover arrangement of FIG. 1, with the upper frame in its raised position.
Figure 2:
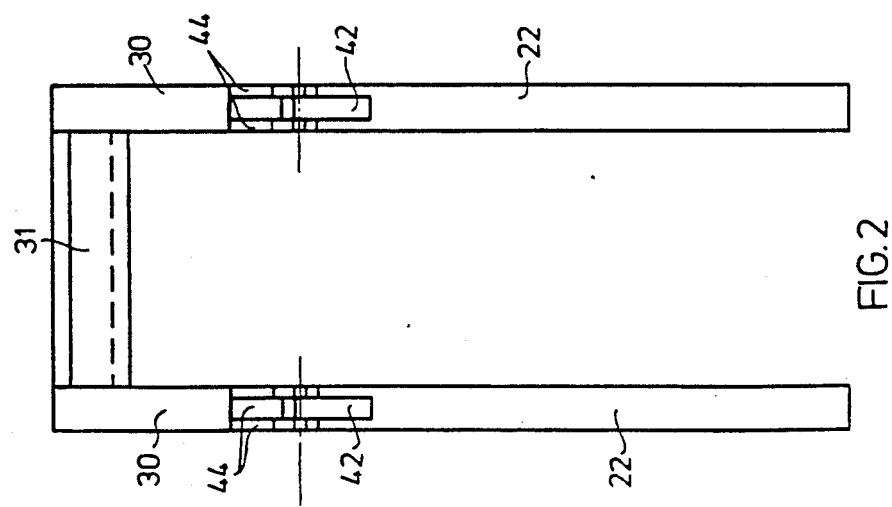

As best seen in FIGS. 2 and 3, the upper frame 29 is U-shaped and includes two legs 30 and a cross piece 31. The posts 22 carry brackets 34 (best seen in FIGS. 4 and 5) in their upper end regions, which engage recesses in the legs 30 of the upper frame 29 when the upper frame is in its raised position. Cross holes 36, 38 are provided in the brackets 34 and the upper frame 29 which are parallel to the rotational axis 32, and which are in alignment when the upper frame 29 is in its raised position, so that a retaining pin 40 can be inserted through the corresponding cross holes 36, 38.

A bracket 42 is attached at the sides in the upper region of the posts 22. In addition, a bracket 44 is attached on each side near the ends of the legs 30. The brackets 42 of the posts 22 are connected with the bracket 44 of the upper frame 29 by the pivot pin 32. In addition the brackets 42, 44 are provided with holes 46, 48 oriented parallel to the rotational axis 32, which are in alignment when the upper frame is tilted downward, so that the retaining pin 40 can be inserted through the corresponding holes 46, 48.

A pipe-shaped guide 50 is attached to the upper frame 29 near the end of one of the legs 30. A lever 52 slidably positioned within the guide 50. When the upper frame 29 is raised, the lever 52 extends downward out of the guide 50, as shown in FIG. 3.

Figure 5:
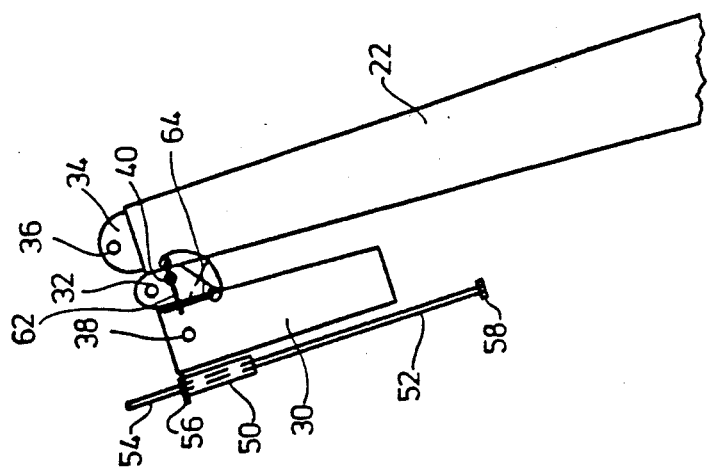
FIGS. 4 and 5 show views corresponding to FIGS. 2 and 3 in which the upper frame is tilted downward.
Figure 4:
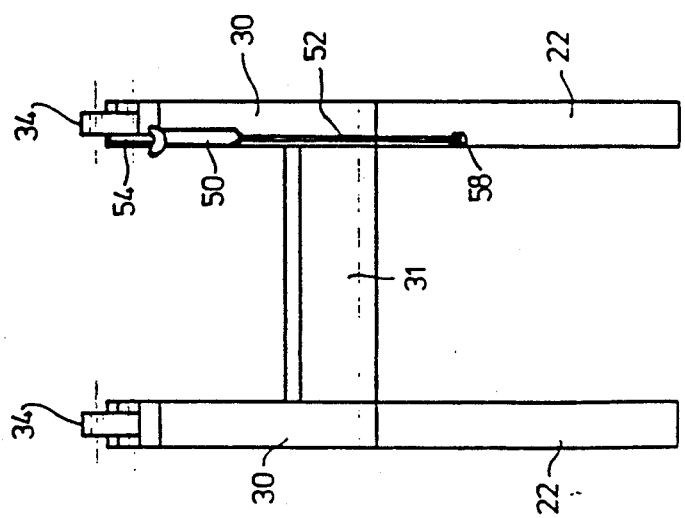

One end of the lever 52 is equipped with a handgrip 54. The handgrip 54 can be grasped by the operator in order to tilt the upper frame 29. The handgrip 54 is separated from the balance of the lever 52 by a disk-shaped shield 56. A stop 58 is located at the opposite end of the lever 52, which prevents the lever 52 from sliding out of the guide 50. When the upper frame 29 is tilted downward, the lever 52 slides through the guide 50, so that the end of the lever 52 with the stop 58 extends far downward out of the guide 50, while the handgrip 54 is in contact with the guide 50, as shown in FIGS. 4 and 5.

As previously noted, the position of the upper frame 29 can be secured by inserting the retaining pin 40 through one of the corresponding pairs of holes 36, 38 or 46, 48. As best seen in FIGS. 6, 7 and 8, the retaining pin 40 is provided at one end with a handgrip 60 that is rectangular in shape and ends in a cross bar 62. The handgrip 60 is made from round bar and welded to the retaining pin 40. A spring 64 is attached to the upper frame 29 in the vicinity of the holes 38, 48. The spring 64 includes a straight portion 66 which is connected by two coils 68 to a curved portion 70. The straight portion 66 is welded at two places to the upper frame 29. Its free leg is longer than the free leg of the curved portion 70.

The cross bar 62 can be clamped between the straight portion 66 and the curved portion 70 by rotating the retaining pin 40, thereby preventing the retaining pin 40 from sliding out of the holes 36, 38 or 46, 48. The spring 64 is attached to the upper frame 29 in such a way that it is in the operating range of the cross bar 62 of the retaining pin 40 when the latter is inserted in the holes 38, as well as in the operating range of the cross bar 62 of the retaining pin 40 when it is inserted in the hole 48. By this means only a single retaining spring 64 is required to secure the pin in both its positions.

Preferably, to assure that the retaining pin 40 cannot be lost, it is connected with the coils 68 of the spring 64 by a wire 72.

To tilt the upper frame 29 downward, for example, to negotiate a low clearance passage, the operator proceeds as follows:

The operator turns to the rear without leaving the operator's seat 16, and grasps the handgrip 54 with one hand. By use of the handgrip 60, the operator rotates the retaining pin 40 until the cross bar 62 is disengaged from the spring 64, then withdraws the retaining pin 40 from the cross holes 36, 38. With that the upper frame 29 is free to be tilted. The retaining pin 40 can be released, since it is connected by the wire 72 to the spring 64, and hence cannot be lost.

Now the operator can tilt the upper frame 29 to the rear and downward by swinging the lever 52 upward. By slightly rotating the upper frame 29, the operator can align the holes 46 and 48 and insert the retaining pin 40 and rotate it until the cross bar 62 engages the spring 64. Thereupon the upper frame 29 is secured in its tilted position and prevented from oscillating. After that, the operator can either release the handgrip 54 and allow gravity to pull the lever 52 downward through the guide 50, or can push the lever 52 down.

Tilting the upper frame 29 upward follows the reverse procedure.

While the invention has been described in conjunction with a specific embodiment, it is to be understood that many alternatives, modifications and variations will be apparent to those skilled in the art in light of the aforegoing description. Accordingly, this invention is intended to embrace all such alternatives, modifications and variations which fall within the spirit and scope of the appended claims.

I claim:

1. A rollover protection system for a vehicle having an operator station, comprising:
   a. a pair of posts mounted to and directed generally upwards from the vehicle;
   b. upper frame means pivotally mounted to the upper ends of said posts and pivotably between and raised and lowered positions; and
   c. a lever mounted to said upper frame means, said lever being positioned to allow an operator in said operator station to manually move said upper frame means back and forth between said raised and lowered position.

2. The rollover protection system of claim 1, further comprising a guide mounted to said upper frame means, said lever being slidably positioned in said guide.

3. The rollover protection system of claim 2, wherein said lever is provided with at least one stop to prevent said lever from sliding out of said guide.

4. The rollover protection system of claim 3, wherein said lever is provided with a handgrip at one end thereof.

5. The rollover protection system of claim 5, wherein said lever is provided with a disk-shaped shield near said handgrip, but closer to said guide than said handgrip.

6. The rollover protection system of claim 3, wherein said guide is substantially perpendicular to the pivot axis between said upper frame and said posts.

7. The rollover protection system of claim 1, further comprising holding means for holding the upper frame in either of said raised and lowered positions.

8. The rollover protection system of claim 7, wherein said upper frame means is provided with two recesses, one adjacent the upper end of each said post, each said post is provided with a corresponding bracket for engagement with said recesses, and said bracket and said upper frame means have corresponding cross holes formed therein through which a retaining pin can be inserted to hold said upper frame means in said raised position, said recesses, brackets, holes and pin forming part of said holding means.

9. The rollover protection system of claim 7, wherein said upper frame means and at least one post each are provided with at least one bracket, said brackets having corresponding holes formed therein through which a retaining pin can be inserted to hold said upper frame means in said lowered position, said brackets, holes and pin forming part of said holding means.

10. The rollover system of claim 7, wherein said holding means includes a retaining pin engagable to hold said upper frame means in either of said raised and lowered positions, said retaining pin being provided with a loop-shaped handgrip at one end thereof.

11. The rollover system of claim 10, wherein said retaining pin further comprises a cross bar near said handgrip, and wherein the upper frame is provided with a retaining spring selectively engageable with said cross bar to hold said retaining pin.

* * * * *